(12) United States Patent
Hu et al.

(10) Patent No.: US 7,376,864 B1
(45) Date of Patent: May 20, 2008

(54) METHOD AND SYSTEM FOR DIAGNOSTIC PRESERVATION OF THE STATE OF A COMPUTER SYSTEM

(75) Inventors: Wei Ming Hu, Palo Alto, CA (US); Juan R. Loaiza, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 778 days.

(21) Appl. No.: 09/223,660

(22) Filed: Dec. 30, 1998

(51) Int. Cl.
*G06F 11/00* (2006.01)

(52) U.S. Cl. .............................. 714/8; 714/25
(58) Field of Classification Search ............ 714/6, 714/8, 9, 11, 12, 13, 25, 26, 27, 31, 33, 34, 714/41, 42, 48, 37
See application file for complete search history.

(56) References Cited

U.S. PATENT DOCUMENTS

| | | | |
|---|---|---|---|
| 4,091,455 A * | 5/1978 | Woods et al. ............. 364/200 |
| 4,164,017 A * | 8/1979 | Randell et al. ............ 714/15 |
| 4,811,345 A * | 3/1989 | Johnson .................. 371/16 |
| 5,404,483 A * | 4/1995 | Stamm et al. ............. 711/144 |
| 5,485,573 A * | 1/1996 | Tandon ................. 395/183.01 |
| 5,491,791 A * | 2/1996 | Glowny et al. ........ 395/183.13 |
| 5,922,079 A * | 7/1999 | Booth et al. ............... 714/26 |
| 5,951,695 A * | 9/1999 | Kolovson .................. 714/16 |
| 5,966,300 A * | 10/1999 | Flood et al. ................ 700/2 |
| 5,968,185 A * | 10/1999 | Bressoud et al. ........... 714/10 |
| 5,983,360 A * | 11/1999 | Ugajin .................... 714/11 |
| 6,134,673 A * | 10/2000 | Chrabaszcz ................. 714/3 |
| 6,151,684 A * | 11/2000 | Alexander et al. ........... 714/4 |
| 6,195,760 B1 * | 2/2001 | Chung .................... 714/4 |

* cited by examiner

*Primary Examiner*—Tim Vo
(74) *Attorney, Agent, or Firm*—Bingham McCutchen LLP (57) ABSTRACT

A method and system for diagnostic preservation of the state of resources in a computer system after a failure is disclosed. An aspect of the invention is directed to the real-time diagnostic analysis of a computer system after a failure, in which the state of resources needed for the diagnostic analysis are preserved from the time of the failure. The computer system is then accessed by using other resources on the computer system, and the preserved resources are analyzed to debug the failure.

72 Claims, 11 Drawing Sheets

| Process Type | Process IDs |
| --- | --- |
| OS Processes | Process 0, Process 1 Process 10 |
| Database Application Processes | Process 2, Process 3, Process 4, Process 7, Process 8 |
| Oracle Database Application Processes | Process 2, Process 3, Process 4 |
| Acme Database Application Processes | Process 7, Process 8 |
| I/O Application Processes | Process 9, Process 11 |
| Communications Application Processes | Process 6, Process 12 |
| ⋮ | ⋮ |

Fig. 4

| Failure Type | Processes to suspend |
|---|---|
| Database application Failure | Database application processes |
| Database application failure with DB I/O operation failure | Database application processes; I/O processes |
| Failure type 3 | Communications processes |
| Failure type 4 | Operating system processes |
| . . . | . . . |

| Failure Type | Processes to suspend | Resources to state freeze |
|---|---|---|
| Database application Failure | Database application processes | Resources associated with database application processes |
| Database application failure with DB I/O operation failure | Database application processes; I/O processes | Resources associated with database application processes; resources associated with I/O processes |
| Failure type 3 | Communications processes | Resources associated with communications processes |
| Failure type 4 | Operating system processes | Resources associated with operating system processes |
| . . . | . . . | . . . |

METHOD AND SYSTEM FOR DIAGNOSTIC PRESERVATION OF THE STATE OF A COMPUTER SYSTEM

BACKGROUND OF THE INVENTION

1. Field of the Invention

The present invention is related to computer systems. More particularly, the present invention is directed to a method and system for diagnostic preservation of the state of a computer system after a failure.

2. Background

Computer systems employ a variety of error handling procedures to address the occurrence of a system or application failure. Often, the error handling procedures perform actions that are designed to aid in the later "debugging" or diagnostic analysis of the failure.

One common approach taken by error handling procedures to assist in debugging a failure is to perform a "core dump" operation after the occurrence of a system or application failure. A core dump operation generates a core dump file, which is an image of the system memory at the time of the core dump. The system memory information in the core dump file contains data relating to the identity and state of pending application processes on the system. The core dump operation is normally performed at the moment the failure is detected, so that the state of the system memory at the time of the failure is preserved for future analysis. Analysis of the core dump file can be performed to assist in debugging the underlying programming or system errors that caused the failure.

One significant drawback to debugging using core dump analysis is that under certain circumstances, the core dump file may not contain enough information about the state of the system to sufficiently debug a failure. For example, since the core dump file only contains an image of the system memory, the state of other resources on the system, such as network and I/O resources, are not preserved in the core dump file. Successful debugging operations using core dump analysis may be rendered impractical or impossible if the state of these other resources are needed to fully perform an analysis of the failure.

In addition, core dump files are typically very large files that are notoriously difficult to analyze. Even with advanced core dump analysis tools, debugging a failure by analyzing a core dump file remains a very involved and complex process. Moreover, since the computer system's main memory can be quite large, generating one or more core dump files can consume a costly amount of disk space. A significant amount of time may need to be consumed to generate the core dump file, which can delay recovery and error handling operations on the system. Under certain circumstances, an application that is completely frozen may not be able to execute error handling procedures to generate a core dump file, thereby leaving no record of the state of the system at the time of failure for future diagnosis purposes.

To address these issues, an aspect of the present invention is directed to a method for diagnosing failures on a computer system without the need to generate and analyze core dump files. Failures can be diagnosed by performing real-time debug operations onto a live computer system, to directly analyze and examine the system resources of the failed system. In this manner, failures can be analyzed without the use of core dump files.

To effectively perform real-time debugging on a live computer system after a failure, the states of system/application resources must be properly preserved from the moment of a failure. A significant problem in implementing this aspect of the invention on conventional computer systems is that resources on the computer system may be modified or reallocated subsequent to a failure. For example, error handling procedures on conventional computers systems commonly change the state of resources on computer systems after a failure, often in an attempt to maintain the continued availability of the system to users.

One approach to achieving continued availability of a computer application after a failure is to utilize "fail-over" procedures. With fail-over procedures, each primary computer is associated with one or more redundant computers on a network. If a failure occurs on a primary computer, the network address and other identification settings for that primary computer are moved over to a backup computer. All further requests to that system will thereafter be directed to the backup computer, which effectively becomes the new primary computer.

Conventional fail-over techniques are optimized around application availability, with the goal to regain access for users as quickly as possible on a redundant computer, and to repair the failed computer so that it can act as a standby should a new failure occur to the redundant computer (which is the new primary). However, such techniques often involve changes to the state of system resources on the failed computer, causing modification or reallocation of resources that may be needed to debug/diagnose the cause of the failure. Moreover, the diagnostic analysis operations themselves will require the use of system resources, thereby potentially causing changes or modifications to resources that must be examined to diagnose the failure. Conventional systems do not provide a method or mechanism to prevent the change or destruction of the state of resources that need to be analyzed in real-time during the debug operations.

Based upon the foregoing, it is desirable to provide a mechanism and method for handling a failure on a computer system that preserves the state of resources on the system for diagnostic purposes.

SUMMARY OF THE INVENTION

A method and system for diagnostic preservation of the state of resources in a computer system after a failure is disclosed. An aspect of the invention is directed to the real-time diagnostic analysis of a computer system after a failure, in which the state of resources needed for the diagnostic analysis are preserved from the time of the failure. The computer system is then accessed by using other resources on the computer system, and the preserved resources are analyzed to debug the failure.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention is a method and mechanism for preserving the state of system resources during error handling by a computer system. The state of the system resources are frozen to permit diagnostic operations to be performed on the system after the failure. Only after explicit user command is the state of the computer system reinitialized and reintegrated into the rest of the network. The following description is made in the context of freezing the state of an application or system upon error handling involving a fail-over procedure. However, the present invention is not limited to only failures involving fail-over procedures, and may be implemented to preserve the state of the system after any failure, regardless of whether fail-over techniques are utilized.

Figure 1:
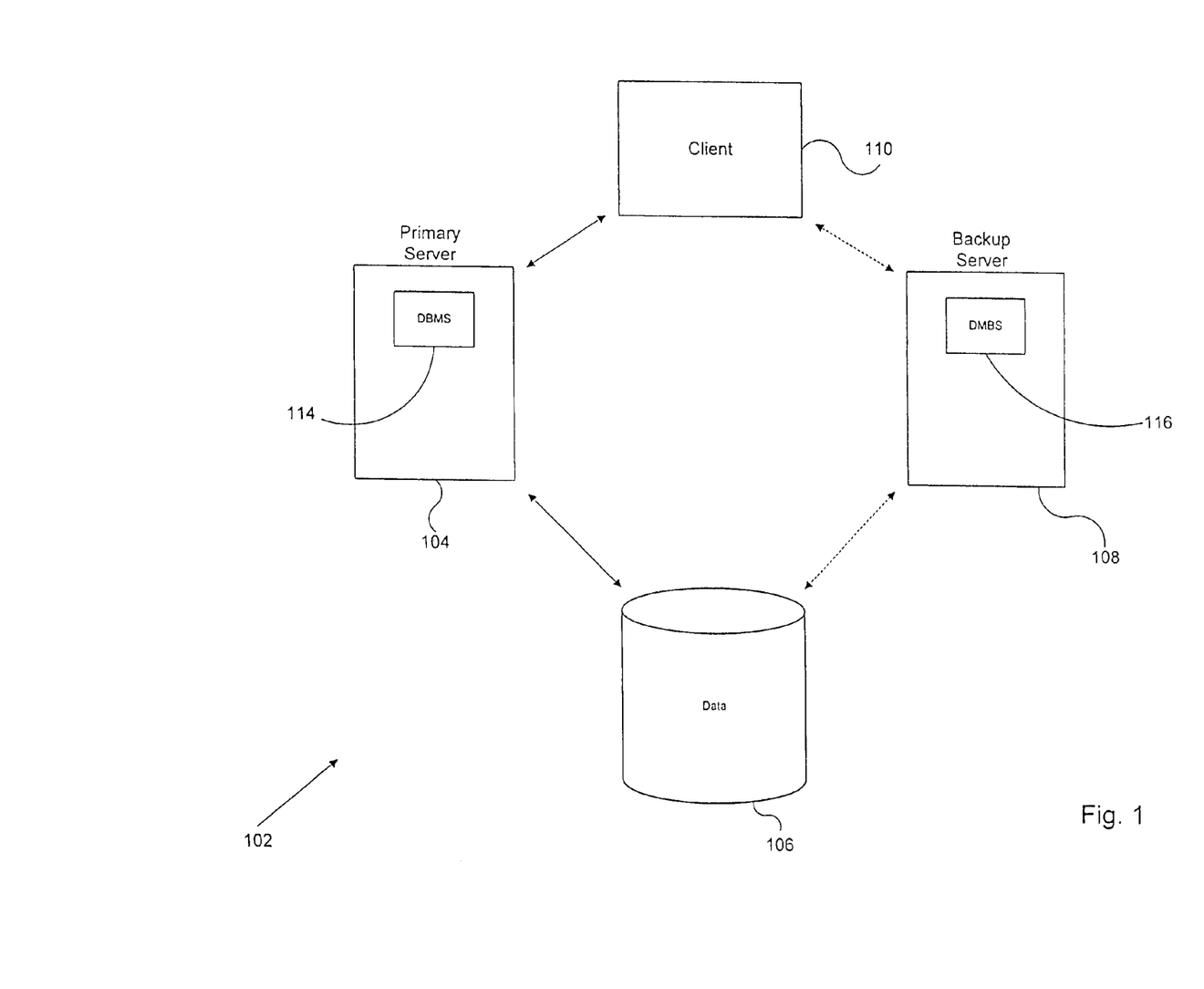
FIG. 1 illustrates an example of a system architecture that can be used for a fail-over procedure.

FIG. 1 depicts a system 102 capable of supporting fail-over procedures according to an embodiment of the invention. Primary server 104 and backup server 108 represent two computer systems that can provide access to a server resident application, such as a database management system ("DBMS") application. A DBMS application 114 is located on primary server 104 while a backup DBMS application 116 is located on backup server 108. A client node 110 accesses the DBMS application 114 by connecting to the primary server 104. DBMS application 114 on primary server 104 stores and retrieves data on a data storage device 106 (e.g., a disk drive).

Should a failure occur on primary server 104, fail-over techniques can be implemented to move all application requests to the backup server 108. If a failure occurs to DBMS application 114 on primary server 104, the primary server 104 is taken offline while the network address and other identification settings of the backup server 108 are reset to duplicate those of the primary server 104. Once these parameters have been reset, all further requests from a client 110 to primary server 104 will be routed to backup server 108 (which essentially becomes the new "primary" server). The backup DBMS application 116 is initialized, if it is not already active, to begin processing application requests on behalf of client 110 or any other clients on the network. The configuration settings of the backup server 108 and the data storage device 106 are configured to allow the backup server 108 to access the application data previously stored on data storage device 106.

The present invention provides a method and mechanism to preserve the state of resources on the primary system 114 during the fail-over procedure. The resources that are preserved are those which potentially must be examined to perform a diagnostic analysis of the failure. By preserving or "freezing" the state of this set of resources, other resources on the system can be later re-used or allocated for debug purposes while assuring the preservation of the state of resources needed for diagnostic analysis.

Figure 2:
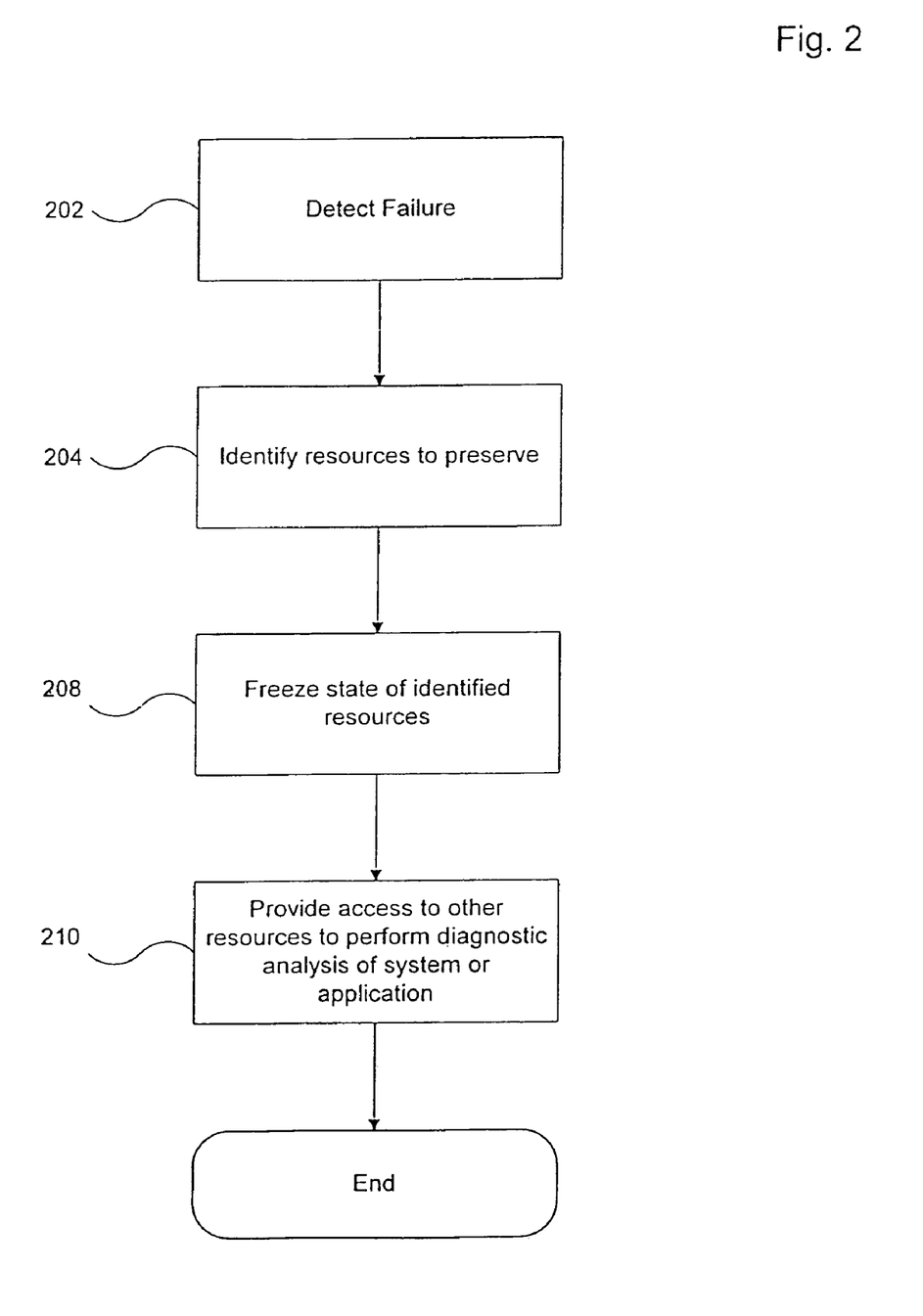
FIG. 2 is a process flow diagram of an embodiment of the invention.

FIG. 2 is a flow diagram illustrating the manner in which an embodiment of the invention is implemented. At process action 202, a failure in the primary server 104 is detected. The failure could be to the operating system, to one or more software applications, and/or to one or more hardware components on the system. An implementation of the invention comprises an external monitoring agent that periodically checks the state of hardware/software components on the system. An example of a commercially available monitoring agent includes the MC Serviceguard product from Hewlett Packard Corporation. Error handling procedures are implemented upon detection of a failure. The error handling procedures can include the execution of fail-over techniques to bring the backup server 108 online to handle further requests from the client 110.

Once a failure is detected, the resources on primary server 104 whose state must be preserved for diagnostic purposes are identified (process action 204). The identified resources are system resources related to the failed hardware/software components that potentially must be analyzed to debug the failure. In an embodiment, the identified resources consist of a set of processes that are to be suspended to preserve the state of the system for diagnostic purposes. Alternatively, the identified resources also comprise other resources on the system whose state are to be explicitly frozen to preserve the system for later diagnostic analysis.

At process action 208, the state of the identified resources are suspended. Once the state of the identified resources are frozen, access is provided to the primary server 104 for diagnostic analysis of the failure. Since the state of resources to be examined have already been frozen, other (non-frozen) resources on the system can be allocated for purposes of the diagnostic analysis procedure (process action 210).

In a present embodiment, to identify the resources to preserve after a failure, processing entities are associated or "registered" with specific applications on the system. Examples of processing entities include processes, threads, tasks or entire application programs. To minimize the number of resources that are to be preserved after the failure, only those processing entities that are projected to relate to resources required for failure analysis are registered. Alternatively, every processing entity on the system can be registered to ensure the preservation of all necessary resources for failure analysis. For purposes of illustration, the following discussion describes the invention with reference to processes on a system, but the invention is equally applicable to all types of processing entities.

Figure 4:
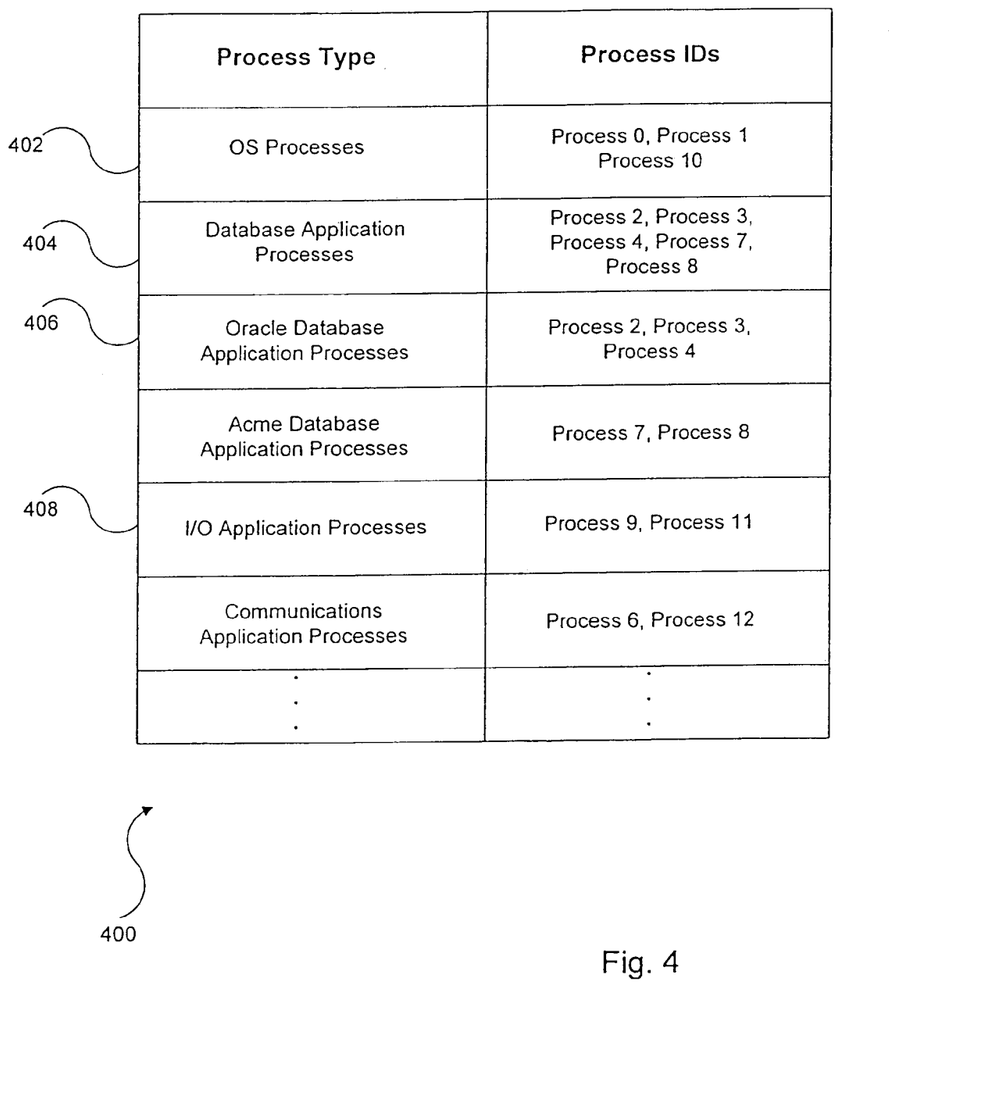
FIG. 4 shows an embodiment of a table to categorize process types.

FIG. 4 depicts an example of a process identification table 400 that associates applications to particular processes on a system. In row 402, processes 0, 1, and 10 are identified as being processes associated with the operating system. Row 404 identifies processes 2, 3, 4, 7, and 8 as being processes associated with database applications. Row 406 identifies processes 2, 3, and 4 as being associated with an Oracle database application. Note that processes can be associated with a plurality of process types. For example, processes 2, 3, and 4 are identified as being associated with the process type "database application" as well as the more specific "Oracle database application" process type. Processes 9 and 11 are identified as being processes of type "I/O application." Processes 6 and 12 are identified as being processes of type "communications application".

Consistent with the invention, possible failure conditions and failure events are categorized into failure types. Projected failure events/conditions can be categorized according to the applications that are affected by the failure. Different failure events/conditions require different categories of system resources to be preserved and later analyzed to diagnose a failure. For example, diagnosis of database application failures may require the state of resources associated with database applications to be frozen, whereas failures to other application/system components may require other categories of processes to be preserved for future analysis.

Figure 5:
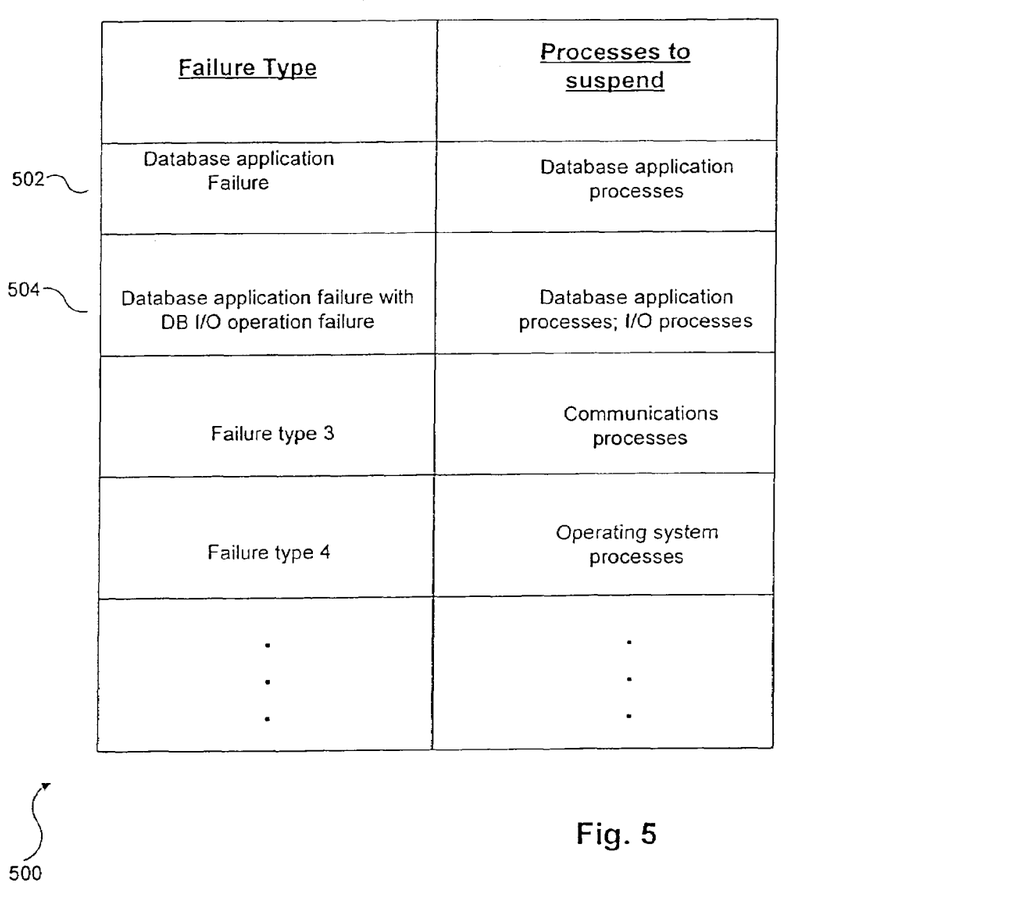
FIG. 5 shows an embodiment of a table to categorize failure types.

FIG. 5 depicts an example of a failure type table 500 that identifies processes to suspend after a failure. For example, row 502 identifies processes to suspend upon failures of failure type "database application failures." Such failures include failures that result from or are affected by a failure of a database application. If such a failure occurs, the table of FIG. 5 would identify all database application processes as resources to be preserved for later diagnostic analysis. By referring to the process type table 400 (FIG. 4), these database application processes are identified as processes 2, 3, 4, 7, and 8. Thus, these identified processes are suspended if a failure of this type occurs. If a determination cannot be made as to what type of failure has occurred, then all registered processes can be suspended.

In an embodiment, the suspension of a process automatically freezes the state of any other system resources associated with the suspended process. For example, the state of a memory buffer allocated to a process is frozen if its corresponding process is frozen.

Figure 3:
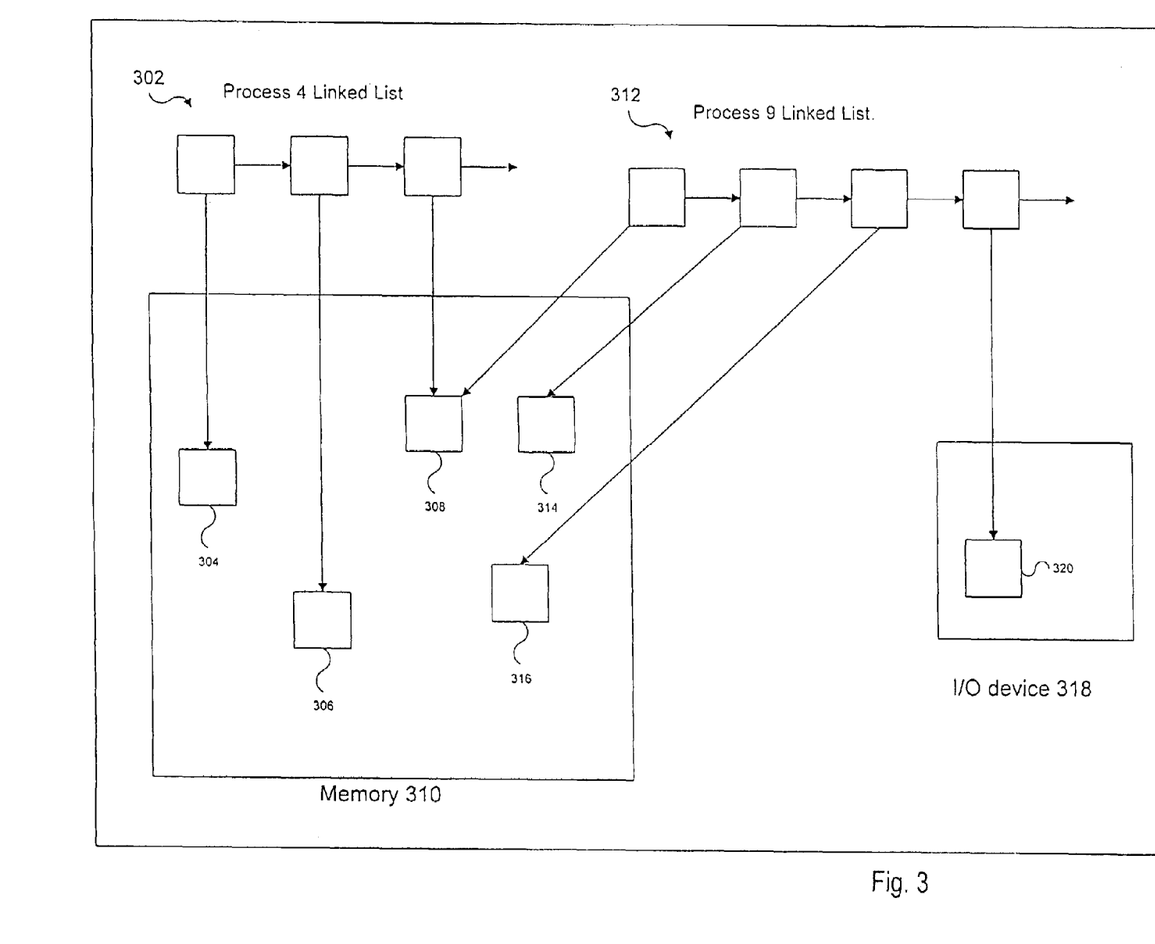
FIG. 3 depicts an embodiment of a method and mechanism for associating system resources to processes.

Other system resources to be frozen after a failure (i.e., resources other than processes) can also be specifically identified by the failure type table. FIG. 3 depicts an embodiment of the invention in which linked lists are used to maintain an association between processes and other resources on a system. In the example of FIG. 3, a separate linked list is maintained for each process on the system and its corresponding resources that may require state freezing in the event of a failure. Alternatively, a single linked list can be maintained for all processes on the system relating to a particular application or process type. Each time a resource is allocated to a process, the identification of that resource is placed in the linked list for that process. If an already-allocated resource becomes related in some way to a process, the identification of that resource is also placed in the linked list associated with that process. If a resource is de-allocated or de-associated from a process, the linked list for that process is modified to delete the reference to that resource.

In the example of FIG. 3, linked list 302 identifies the system resources associated with process 4 on the system while linked list 312 identified the system resources associated with process 9 on the system. Memory buffers 304, 306, and 308 within system memory 310 are all associated with process 4, and thus are pointed to or identified by linked list 302. Memory buffers 308, 314, and 316 within system memory 310 are associated with process 9 on the system, and thus are pointed to or identified by linked list 312. Note that linked lists 302 and 312 both point to memory buffer 308, indicating that this resource is associated with both process 4 and process 9 on the system. Linked lists 312 also points to an I/O buffer 320 within an I/O device 318 that has been identified as being associated with process 9.

Figure 6:
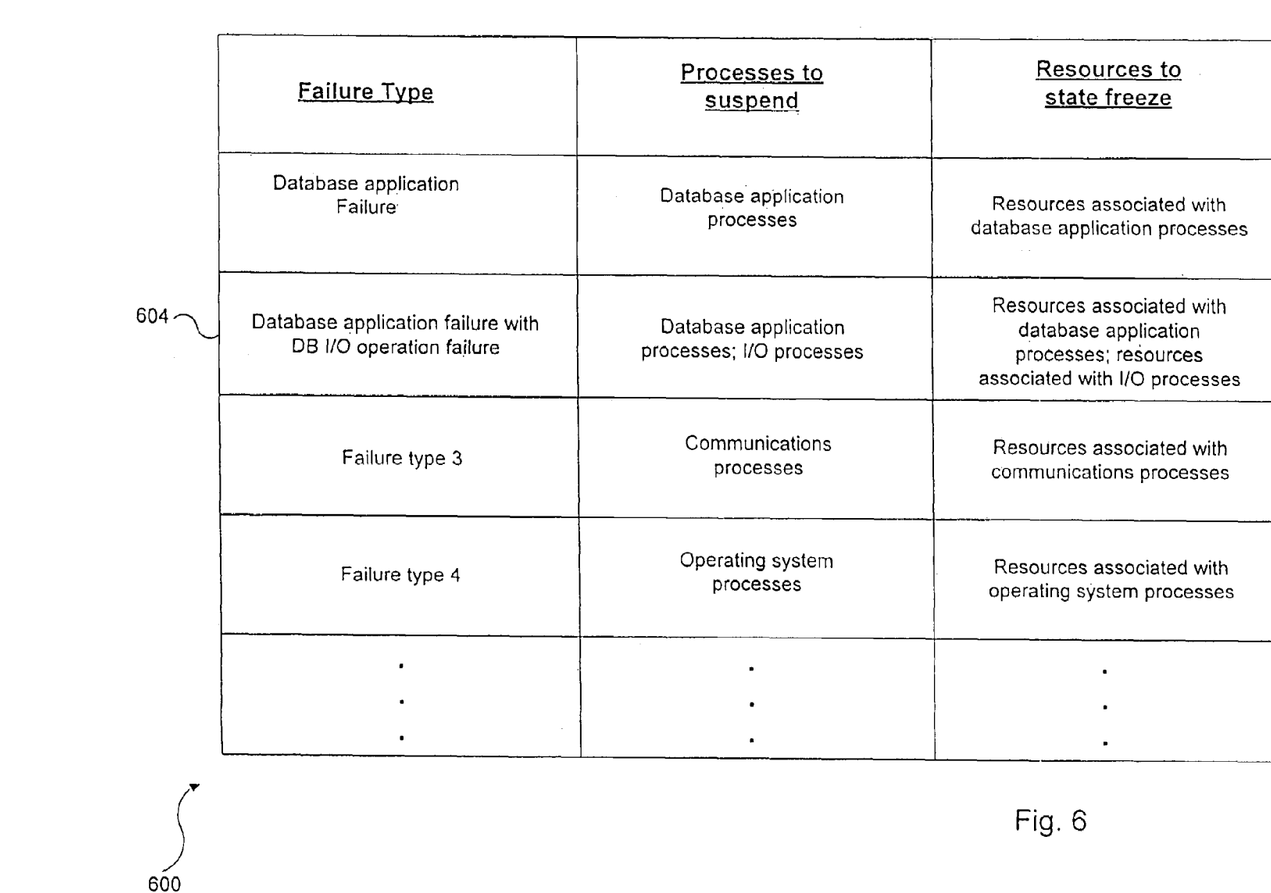
FIG. 6 shows an alternate embodiment of a table to categorize failure types.

FIG. 6 depicts an alternate failure type table 600 that identifies not just processes to suspend, but also identifies specific other resources to freeze upon the occurrence of a particular failure type. Row 604 identifies the resources to freeze upon failures of failure type "database application failure having an I/O operation failure." If such a failure occurs, all database application processes and all I/O processes are identified as processes to suspend. Such processes include database application processes 2, 3, 4, 7, and 8 from row 404 of process type table 400, as well as I/O processes 9 and 11 from row 408 (FIG. 4). In addition, row 604 specifically identifies resources associated with database application processes and I/O processes as additional resources to state freeze. Thus, if process 4 is a database application process, then the state of its associated resources would be frozen. Referring back to FIG. 3, the resources associated with process 4 are identified by linked list 302 as memory buffers 304, 306, and 308. Thus, the present invention provides a method to ensure the identification and state freeze of resources associated with a process even if the system does not automatically freeze the state of resources associated with a process when that process is suspended.

Similarly, if process 9 is an I/O process, then row 604 identifies all resources associated with process 9 as resources that require state freeze. As shown in the example of FIG. 3, the resources associated with process 9 are identified by linked list 312 as memory buffers 308, 314, and 316, as well as I/O buffer 320. Note that this method allows the state of resources outside memory 310 to be preserved. Unlike the core dump approach to perform diagnosis of a failure, which involves a core dump file that contains an image of only the system memory, the present invention permits the identification and state freeze of any resource on the system, including resources outside the system memory such as I/O devices.

The present invention suspends processes on the system after a failure once they have been identified. In an embodiment, this is implemented with the OS scheduler in the operating system, in which the identified processes are suspended at the point that the failure is detected. The OS scheduler suspends the identified process by not permitting these processes to run (i.e., the processes are not assigned any processing time). Since the processes are not permitted to run, the state of the processes are preserved until diagnostic analysis can be performed to debug the failure. The processes remain suspended until explicit instruction is given to unfreeze these processes. Any incoming events that would normally cause the suspended processes to run (such as I/O completion or timer interrupts) are blocked.

Figure 7:
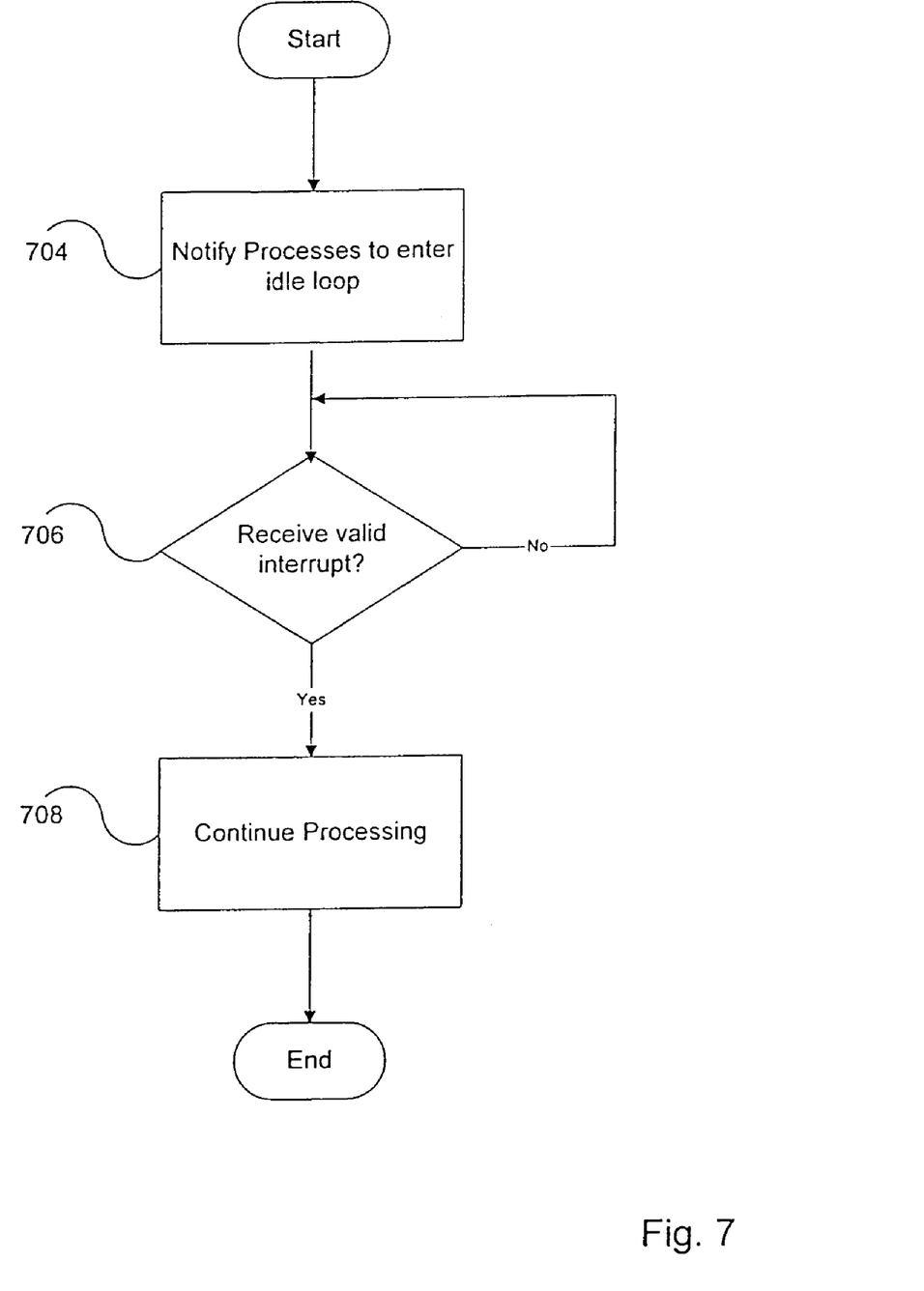
FIG. 7 is a flow diagram of a method to suspend a process in an embodiment of the invention.

Alternatively, the applications themselves can suspend their associated processes. Referring to FIG. 7, shown is an embodiment of the process flow for this aspect of the invention. Each application subject to this aspect of the invention includes a signal handler that causes each process of the application to enter an idle loop upon a detected failure (process action 704). The signal handler is a section of programming code that executes when a signal is received. When a failure is detected by a monitoring tool, the failure handling mechanism sends a signal to the appropriate processes to enter the idle loop. The signal causes the each of the processes that receive the signal to enter its signal handler and stay in the idle loop. The process stays within an idle loop until a valid interrupt signal is received at the suspended process (process action 706). Since the process is in an idle loop, the state of the process is preserved for future diagnostic analysis. The process exits the idle loop only when a valid interrupt signal is received (process action 708).

Figure 11:
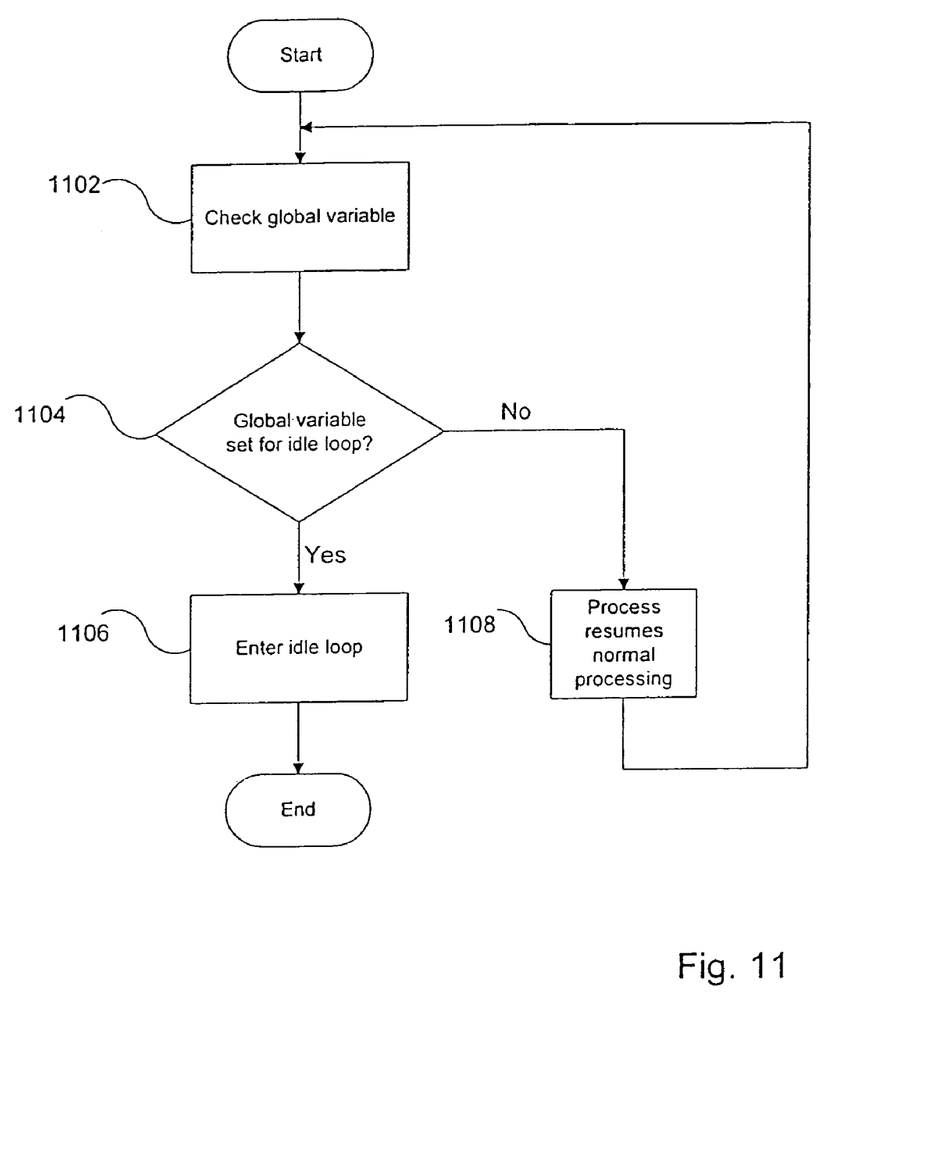
FIG. 11 is a flow diagram of an alternate embodiment of a method for suspending a process after a failure.

FIG. 11 depicts a process flow diagram of an alternate method for implementing an idle loop in which a global variable is used. In this alternative approach, a single signal handler is established by a single process for each application. When a failure is detected, a signal is sent to the process having the signal handler. Upon receipt of the signal, the process sets a global variable that is accessible by all other processes for the application. The process comprising the signal handler then enters an idle loop.

The application processes that did not establish the global variable periodically sample the global variable. At pre-defined intervals, each of the other processes for the application samples the global variable (process action 1102). The sampled global variable is tested to determine whether a failure has occurred that requires the application processes to be suspended (process action 1104). If the global variable has been set, then the process enters an idle loop (process action 1106). The process exits the idle loop only upon explicit instructions. If the global variable has not been set, then the process resumes its normal operation (process action 1108). After an interval of time, the process would repeat these process actions to resample the global variable. To ensure that the global variable is sampled often enough, the sampling code can be placed into a frequently called subroutine. The global variable would then be sampled whenever the subroutine carries out its normal operation.

Once the appropriate resources have been frozen, the system is ready to be used for debugging purposes. The debugging operation itself will require the use of system resources. However, the state of resources identified as potentially being required for analysis have already been frozen. Thus, the debugging operation will not be able to use the set of resources that have already been identified for preservation. If the debugging operation requires the use or allocation of resources, the newly allocated resources will not include resources from the set of identified (frozen) resources. Moreover, if de-allocation is required to obtain the necessary resources for the debugging operation, the de-allocation will not occur to resources identified as being part of the set of frozen resources.

Certain redundant hardware components may be maintained to further provide the ability to freeze the state of the system for diagnostic purposes. Referring back to FIG. 1, recall that if a failure occurs at primary server 104, the fail-over procedure causes all further requests to the primary server 104 to be routed to the backup server 108. Since the data storage device 106 stores data used by application 114, control of data storage device 106 is also shifted over to backup server 108 to allow backup application 116 to access the data that had been previously stored by application 114 on the data storage device 106. However, that shifting of control over data storage device 106 to backup server 108 may result in a change of the state of the data storage device 106 before debug operations can be performed. If the state of the data storage device 106 should be preserved to successfully perform diagnostic operations, then a shift of the data strings device 106 to the backup server 108 may negatively affect a later debug operation.

Figure 8:
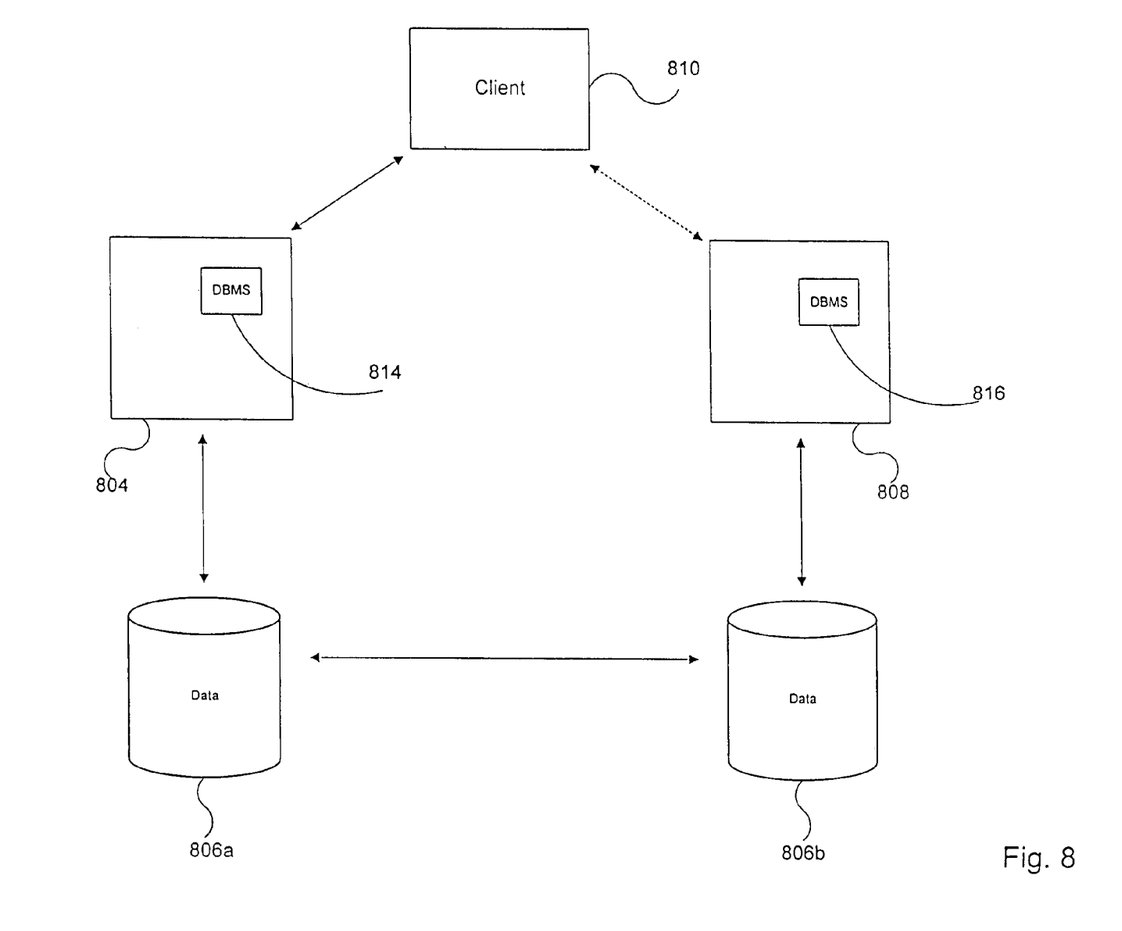
FIG. 8 depicts an alternate embodiment for performing a fail-over procedure according to an embodiment of the invention.

To address this issue, redundant data storage devices can be utilized, as shown in FIG. 8. FIG. 8 depicts a primary server 804 and a backup server 808. An application 814 is resident on primary server 804, while a backup application 816 is resident on backup server 808. The contents of data storage device 806a is mirrored at data storage device 806b. Similar to the example of FIG. 1, if a failure occurs at primary server 804, all further requests can be routed to backup server 808. However, backup server 808 will perform data access operation against the mirrored data storage device 806b. The state of data storage device 806a can thus be preserved from the time of the failure for diagnostic purposes. This principle can be applied to maintain other redundant hardware/software components on the system for later diagnostic analysis purposes.

In the above embodiments, after a failure is detected, the invention identifies a set of resources that are to be preserved. By freezing the state of the identified resources, other resources on the system can be utilized for diagnostic purposes without danger of changing the state of resources that must be preserved and examined from the time of the failure to debug the failure.

In an alternate embodiment, a set of resources can be set aside for diagnostic purposes prior to a failure. During normal operation of the system, these resources are not used by any applications. Once a failure is detected, the debug operation will only use this pre-allocated set of resources to perform debug operations, and will not use any other resources on the system. In this manner, the state of resources needed to be examined on the system can be preserved from the time of a failure, while still allowing access and use of resources on the system for diagnostic purposes.

Figure 9:
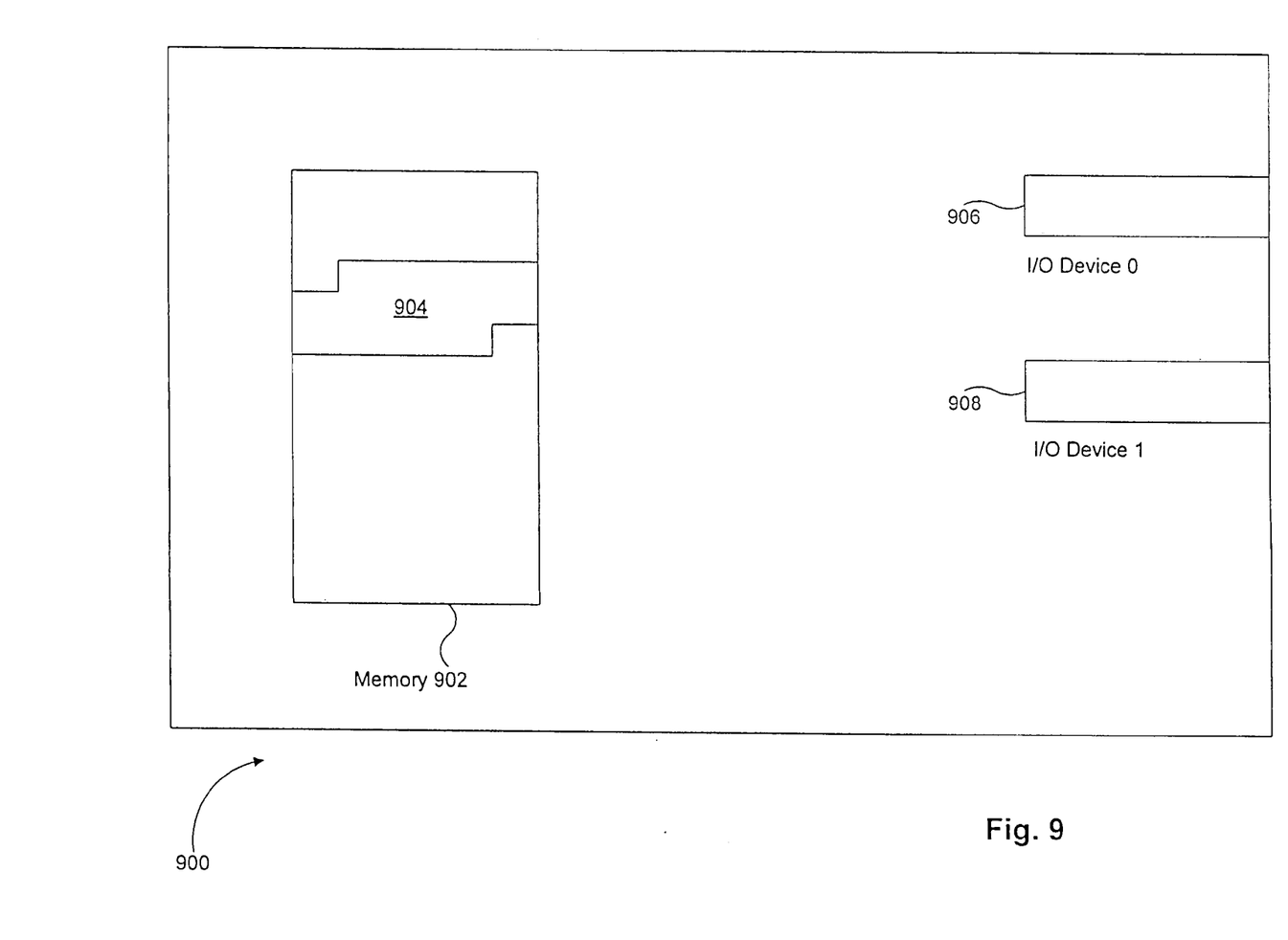
FIG. 9 depicts a system to perform presentation of resource states according to an alternate embodiment of the invention.

FIG. 9 depicts an example of a system 900 directed to this aspect of the invention. Memory 902 has been partitioned to include a memory section 904 that has been set aside for diagnostic purposes. During normal operation, memory buffers within memory section 904 are not allocated for use, or are only used during normal operation by applications or processes for which it is foreseen that later state freeze for diagnostic purposes are not required.

Redundant hardware/software components can be utilized to implement this aspect of the invention. For example, system 900 includes I/O devices 906 and 908. I/O device 906 can be set aside for diagnostic purposes. Thus, only I/O device 908 will be used during normal operation. Once a failure is detected, I/O device 908 will be state freezed, and any later diagnostic operations will be performed using only I/O device 906.

Hardware Overview

Figure 10:
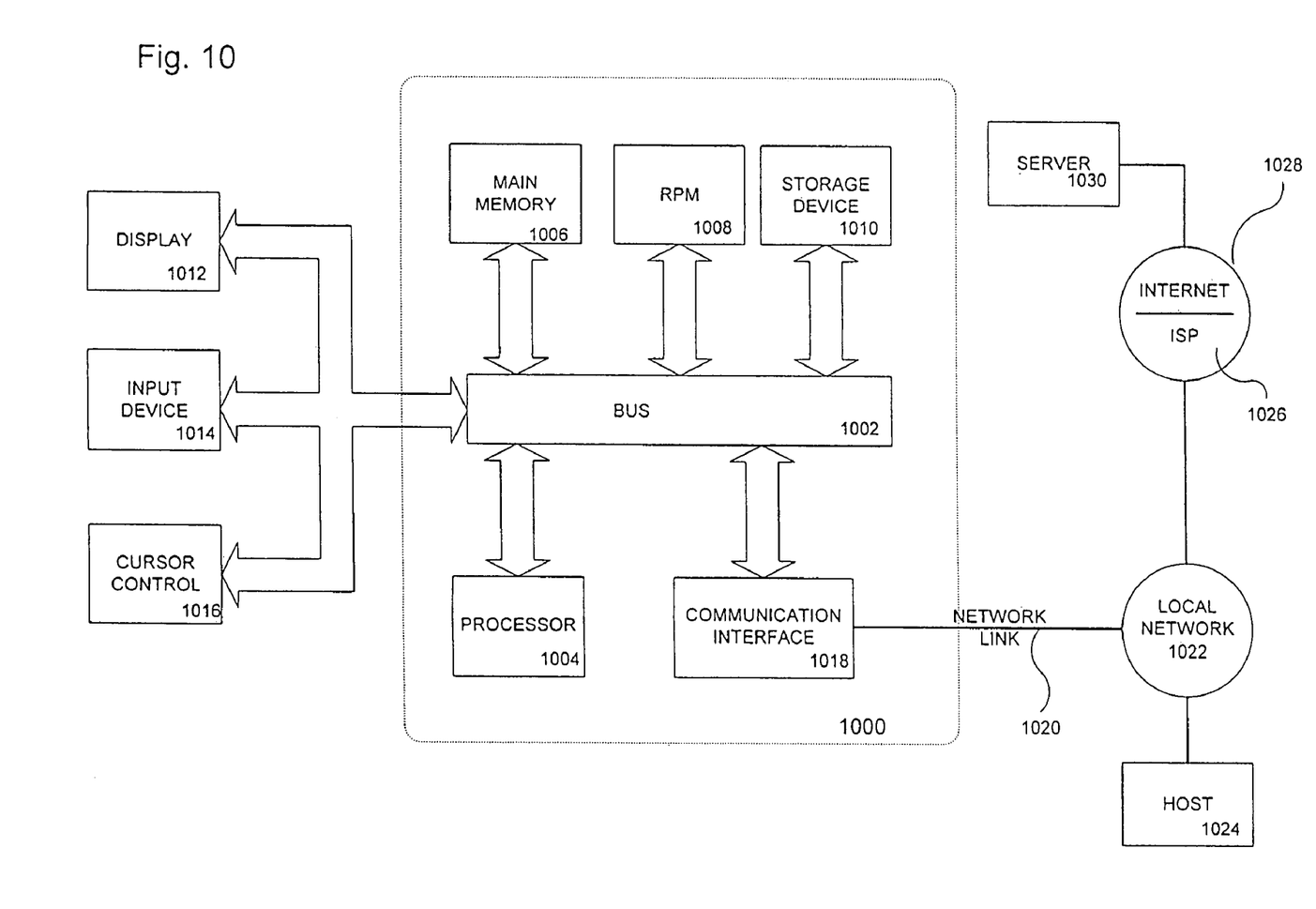
FIG. 10 is a diagram of a computer hardware system with which the present invention can be implemented.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 10400 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for diagnostic prevention of state of the resources on a computer system. According to one embodiment of the invention, such use is provided by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. One or more processors in a multi-processing arrangement may also be employed to execute the sequences of instructions contained in main memory 1006. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infrared transmitter to convert the data to an infrared signal. An infrared detector coupled to bus 1002 can receive the data carried in the infrared signal and place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for the diagnostic preservation of the state of resources on a computer system after a failure.

The received code may be executed by processor 1004 as it is received, and/or stored in storage device 1010, or other non-volatile storage for later execution. In this manner, computer system 1000 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method of diagnosing a computer system after a failure comprising:
   preserving in place the state of a first set of system resources after the failure occurs in the computer system;
   accessing the computer system by utilizing a second set of system resources; and
   diagnosing the failure by analyzing one or more resources from the first set of system resources.

2. The method of claim 1 further comprising:
   maintaining one or more lists of the first set of system resources.

3. The method of claim 1 in which the first set of system resources comprises processing entities.

4. The method of claim 1 in which the second set of system resources comprises system resources that have been set aside for diagnostic purposes.

5. The method of claim 1 in which the second set of system resources comprises redundant hardware/software components.

6. The method of claim 1, wherein preserving in place the state of a first set of system resources comprises freezing the state of the first set of system resources.

7. The method of claim 1, wherein preserving in place the state of a first set of system resources does not require any copying of the state of the first set of system resources.

8. The method of claim 2 in which the one or more lists are linked lists.

9. The method of claim 3 in which the processing entities comprise processes which are categorized into process types.

10. The method of claim 9 in which the act of preserving the state of the first set of the system resources comprises suspending the state of one or more of the processes in the first set of system resources.

11. The method of claim 10 in which the one or more processes to suspend are suspended by being entered into an idle loop.

12. The method of claim 10 in which the one or more processes to suspend are suspended by an operating system scheduler.

13. The method of claim 10 in which the one or more processes to suspend are selected based upon their process type.

14. A method of diagnosing a computer system after a failure comprising:
  detecting a failure on a first computer system;
  implementing fail-over to a second computer system after detecting the failure on the first computer system;
  preserving in place the state of one or more resources on the first computer system;
  accessing the first computer system to diagnose the failure; and
  diagnosing the failure by analyzing the one or more resources.

15. The method of claim 12 further comprising:
  maintaining a redundant system component for the first computer system; and
  shifting control of the redundant system component to the second computer system after the failure.

16. The method of claim 14 in which the one or more resources comprise one or more processing entities.

17. The method of claim 14 further comprising the act of categorizing the failure into a failure type, and in which the failure type corresponds to the choice of the one or more resources to suspend.

18. The method of claim 14, wherein preserving in place the state of one or more resources comprises freezing the state of the first set of system resources.

19. The method of claim 14, wherein preserving in place the state of one or more resources does not require any copying of the state of the one or more resources.

20. The method of claim 15 in which the redundant system component comprises a disk drive.

21. The method of claim 16 in which the one or more processing entities comprise processes.

22. The method of claim 16 in which the act of preserving the state of one or more resources on the first computer system comprises suspending the one or more processing entities.

23. The method of claim 22 in which the one or more processing entities are suspended by being entered into an idle loop.

24. The method of claim 22 which the one or more processing entities to suspend are suspended by an operating system scheduler.

25. A medium readable by a processor, the medium being stored thereon a sequence of instructions which, when executed by the processor, causes the execution of a process of preserving the state of a computer system after a failure by performing:
  preserving in place the state of a first set of system resources after the failure occurs in the computer system;
  accessing the computer system by utilizing a second set of system resources; and
  diagnosing the failure by analyzing one or more resources from the first set of system resources.

26. The medium of claim 25, wherein the process further comprises:
  maintaining one or more lists of the first set of system resources.

27. The medium of claim 25 in which the first set of system resources comprises processing entities.

28. The medium of claim 25 in which the second set of system resources comprises system resources that have been set aside for diagnostic purposes.

29. The medium of claim 25 in which the second set of system resources comprises redundant hardware/software components.

30. The medium of claim 25, wherein preserving in place the state of a first set of system resources comprises freezing the state of the one or more resources.

31. The medium of claim 25, wherein preserving in place the state of a first set of system resources does not require any copying of the state of the first set of system resources.

32. The medium of claim 27 in which the processing entities comprise processes which are categorized into process types.

33. The medium of claim 32 in which the act of preserving the state of the first set of the system resources comprises suspending the state of one or more of the processes in the first set of system resources.

34. The medium of claim 32 in which the one or more processes to suspend are suspended by being entered into an idle loop.

35. The medium of claim 32 in which the one or more processes to suspend are suspended by an operating system scheduler.

36. The medium of claim 32 in which the one or more processes to suspend are selected based upon their process type.

37. A medium readable by a processor, the medium being stored thereon a sequence of instructions which, when executed by the processor, causes the execution of a process of preserving the state of a computer system after a failure by performing:
  detecting a failure on a first computer system;
  implementing fail-over to a second computer system after detecting the failure on the first computer system;
  preserving in place the state of one or more resources on the first computer system;
  accessing the first computer system to diagnose the failure; and
  diagnosing the failure by analyzing the one or more resources.

38. The medium of claim 26 in which the one or more lists are linked lists.

39. The medium of claim 37, wherein the process further comprises:

maintaining a redundant system component for the first computer system; and shifting control of the redundant system component to the second computer system after the failure.

40. The medium of claim 37 in which the one or more resources comprise one or more processing entities.

41. The medium of claim 37 further comprising the act of categorizing the failure into a failure type, and in which the failure type corresponds to the choice of the one or more resources to suspend.

42. The medium of claim 37, wherein preserving in place the state of one or more resources comprises freezing the state of the one or more resources.

43. The medium of claim 37, wherein preserving in place the state of one or more resources does not require any copying of the state of the one or more resources.

44. The medium of claim 39 in which the redundant system component comprises a disk drive.

45. The medium of claim 40 in which the one or more processing entities comprise processes.

46. The medium of claim 40 in which the act of preserving the state of one or more resources on the first computer system comprises suspending the one or more processing entities.

47. The medium of claim 46 in which the one or more processing entities are suspended by being entered into an idle loop.

48. The medium of claim 46 in which the one or more processing entities to suspend are suspended by an operating system scheduler.

49. A system for diagnosing a computer system after a failure comprising:

a preservation module for preserving in place the state of a first set of system resources after the failure occurs in the computer system;

an access module for accessing the computer system by utilizing a second set of system resources; and a diagnosis module for diagnosing the failure by analyzing one or more resources from the first set of system resources.

50. The system of claims further comprising:

a list maintenance module, for maintaining one or more lists of the first set of system resources.

51. The system of claim 49 in which the first set of system resources comprises processing entities.

52. The system of claim 49 in which the second set of system resources comprises system resources that have been set aside for diagnostic purposes.

53. The system of claim 49 in which the second set of system resources comprises redundant hardware/software components.

54. The system of claim 49, wherein preserving in place the state of a first set of system resources comprises freezing the state of the one or more resources.

55. The system of claim 49, wherein preserving in place the state of a first set of system resources does not require any copying of the state of the first set of system resources.

56. The system of claim 50 in which the one or more lists are linked lists.

57. The system of claim 51 in which the processing entities comprise processes which are categorized into process types.

58. The system of claim 57 in which the preservation module preserves the state of the first set of the system resources by suspending the state of one or more of the processes in the first set of system resources.

59. The system of claim 58 in which the one or more processes to suspend are suspended by being entered into an idle loop.

60. The system of claim 58 in which the one or more processes to suspend are suspended by an operating system scheduler.

61. The system of claim 58 in which the one or more processes to suspend are selected based upon their process type.

62. A system for diagnosing a computer system after a failure comprising:

a failure detection module, for detecting a failure on a first computer system;

a fail-over module, for implementing fail-over to a second computer system after detecting the failure on the first computer system;

a resource preservation module, for preserving in place the state of one or more resources on the first computer system;

an access module for accessing the first computer system to diagnose the failure; and a diagnosis module, for diagnosing the failure by analyzing the one or more resources.

63. The system of claims further comprising:

a redundant system component for the first computer system; and a control module for shifting control of the redundant system component to the second computer system after the failure.

64. The system of claim 62 in which the one or more resources comprise one or more processing entities.

65. The system of claim 62 further comprising a categorization module for categorizing the failure into a failure type, in which the failure type corresponds to the choice of the one or more resources to suspend.

66. The system of claim 62, wherein preserving in place the state of one or more resources comprises freezing the state of the one or more resources.

67. The system of claim 62, wherein preserving in place the state of one or more resources does not require any copying of the state of the one or more resources.

68. The system of claim 63 in which the redundant system component comprises a disk drive.

69. The system of claim 64 in which the one or more processing entities comprise processes.

70. The system of claim 64 in which the preservation module preserves the state of one or more resources on the first computer system by suspending the one or more processing entities.

71. The system of claim 70 in which the one or more processing entities are suspended by being entered into an idle loop.

72. The system of claim 70 in which the one or more processing entities to suspend are suspended by an operating system scheduler.

* * * * *